J. W. AYERS.
Handles of Pocket-Knives.
No. 137,648.  Patented April 8, 1873.
fig. 1
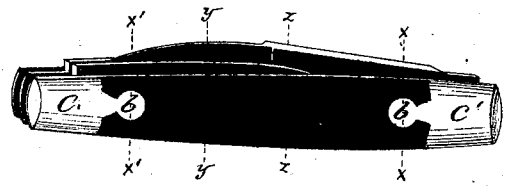
fig. 2
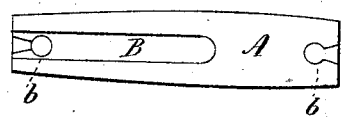
fig. 3  fig. 4  fig. 5
  
fig. 6
Witnesses.
John W. Ayers
Inventor
By Atty.

UNITED STATES PATENT OFFICE.

JOHN W. AYERS, OF WEST MERIDEN, CONNECTICUT.

IMPROVEMENT IN HANDLES OF POCKET-KNIVES.

Specification forming part of Letters Patent No. 137,648, dated April 8, 1873; application filed March 12, 1873.

*To all whom it may concern:*

Be it known that I, JOHN W. AYERS, of West Meriden, in the county of New Haven and State of Connecticut, have invented a new Improvement in Pocket-Cutlery; and I do hereby declare the following, when taken in connection with the accompanying drawing and the letters of reference marked thereon, to be a full, clear, and exact description of the same, and which said drawing constitutes part of this specification, and represents, in—

Figure 1, a perspective view; Fig. 2, an inside view of the outer scale; Fig. 3, a transverse section on line $x\ x$; Fig. 4, a transverse section on line $z\ z$; Fig. 5, a transverse section on line $y\ y$; and in Fig. 6, a transverse section on line $x'\ x'$.

This invention relates to an improvement in the manner of attaching the bolster and outer scale to the inner scale of pocket-cutlery. This has usually been done by rivets, and in the process of attachment the outer scale is frequently broken, particularly so in pearl and ivory; and in the use of cutlery with the scale thus attached the scale breaks or splits at the points where riveted. The object of my invention is to overcome this difficulty; and it consists, first, in forming the outer scale with grooves or recesses of dovetail form, combined with corresponding perforations through the inner scale, countersunk upon the inside, so that a molten metal—preferably white metal—poured through the perforations in the inner scale will flow into the recess in the outer scale, and, when cool, firmly secure the two parts together; second, in uniting the bolster to the scale in the process of casting, a portion of the metal running through a perforation in the inner scale.

A is the outer scale, denoted in solid black in Fig. 1. Upon inside scale is formed a groove, B, of dovetail form, as seen in Fig. 4. I prefer to make this in the form of a groove; yet it may be made of other shape, it only being necessary that substantially the dovetail shape be preserved. Through the scale beneath this recess a perforation, $a$, is formed, as seen in Fig. 5; the inner scale in Figs. 4, 5, and 6 denoted in solid black; and this perforation through the scale is countersunk through the inside. The two scales are placed together in proper position, and a molten metal poured in to fill the recess and perforation, as denoted at $d$ in Fig. 5, which firmly unites the two parts together at that point. In order that this may be done after the scales, blades, and spring are assembled, the groove B is employed, and filled at the same time the bolsters C C' are formed. The scale is perforated, as before described, beneath the bolsters, and at one or more places along the side of the handle. Then the knife is placed in a suitable mold, the outer scale A attached, and the metal poured in to form the bolster, and, at the same time, to run down the groove B, and attach the scale. Afterward the scale and bolster are finished.

By this method none of the rivets by which the blades and parts are secured together appear.

If desirable, the scales may be united and the bolsters formed, then assembled, and a rivet passed through the bolster for the blade-pivot, and another through the scales for the spring-pivot.

As an additional security to the bolster and outer scale, I perforate the outer scale, as at $b$, a little way below the end, and cut out to the end from this perforation, as seen in Figs. 1 and 2. This perforation is made larger upon the outside, as seen in Figs. 3 and 6, preferably by counterboring; therefore when the metal is poured in to form the bolster it will flow in and fill the recess in the outer scale, and serve as a means for holding the scales firmly at the bolster end. Preferably beneath the perforation $b$ I perforate the inner scale, as seen in Fig. 3, that the metal may flow through the scale, and more firmly unite the parts.

In some classes of coverings or scales this last described construction may be sufficient to secure the scale without intermediate fastenings.

The groove B may extend entirely through the length of the covering-scale, so that the metal poured in at one end will flow down and form the bolster at the lower end, thus making both bolsters at the same operation.

I claim as my invention—

1. The method herein described of securing the outer or covering scale to cutlery-handles—that is, constructing the covering-scale with a groove or recess of substantially dovetail form upon the inside, and the metal scale with a corresponding perforation, one or more, so that molten metal poured in to fill the said recess and perforation will unite the covering and metal scale, as set forth.

2. A bolster for the blades of pocket-cutlery, formed upon the scale, the scale perforated beneath the bolster, so that the metal which forms the bolster, flowing through the said perforations, will unite the bolster to the handle.

3. The method herein described of uniting the bolster and covering-scale—that is to say, by forming a recess, $b$, at the bolster end of the scale, so that the metal of the bolster, in the process of casting, flows into the said recess, and secures the scale at the same time of forming the bolster.

JOHN W. AYERS.

Witnesses:
JOHN IVES,
FRED. PEASE.